(12) United States Patent
Nilsson

(10) Patent No.: US 6,749,878 B1
(45) Date of Patent: Jun. 15, 2004

(54) PROVISION OF FROZEN MULTI-LAYERED PASTA AND ITS PREPARATION FOR CONSUMPTION

(75) Inventor: Göran Nilsson, Angelholm (SE)

(73) Assignee: Nestec S.A., Vevey (CH)

( * ) Notice: Subject to any disclaimer, the term of this patent is extended or adjusted under 35 U.S.C. 154(b) by 1012 days.

(21) Appl. No.: 09/092,167

(22) Filed: Jun. 5, 1998

(30) Foreign Application Priority Data

Jun. 6, 1997 (EP) ............................................. 97201716

(51) Int. Cl.⁷ ................................................ A23L 1/162
(52) U.S. Cl. ....................................... 426/557; 426/451
(58) Field of Search .................................. 426/557, 451

(56) References Cited

U.S. PATENT DOCUMENTS

| 3,798,343 A | 3/1974 | Vitale .......................... 426/502 |
| 4,418,085 A | 11/1983 | Becquelet et al. ........... 426/297 |
| 5,509,350 A | 4/1996 | Askman et al. ............. 99/450.2 |

FOREIGN PATENT DOCUMENTS

| DE | 2008787 | 9/1971 | ............ A23C/1/16 |
| FR | 2567368 | 1/1986 | ........... A23C/19/09 |

OTHER PUBLICATIONS

The Good Cook Pasta, pp. 54–55, 166, 1980.*
Felicia Gressette, Miami Herald, Oct. 1989.*
Marsha Hanzel, Richmond News Leader, Aug. 1990.*
Fresh Ways with Pasta, pp. 53–54, 1986.*
Ali–Bab, et al. (Ed.), *L'Art Culinaire Francais*, Flammarion, Paris, 1976, pp. 633–634.
Database Abstract, Derwent Information Ltd., WPI Accession No. 86–057281/198609, abstract of Raffy, French Patent Application Publication No. 2 567 368 (1986).
Database Abstract, Derwent Information Ltd., WPI Accession No. 71–591605/197137, abstract of Righetti, German Patent Application Publication No. 2 008 787.

* cited by examiner

Primary Examiner—Lien Tran
(74) Attorney, Agent, or Firm—Winston & Strawn LLP

(57) ABSTRACT

Pasta product segments formed of layers of pasta sheets, such as is lasagne, which, particularly after being frozen and packed, are provided so that for preparation for consumption, individual segments are arranged and a cooking liquid is added and the segments and cooking liquid are heated, and in an embodiment, the individual segments are arranged so that, upon heating and upon absorbtion of cooking liquid, the segments tend to join and stick together.

13 Claims, 5 Drawing Sheets

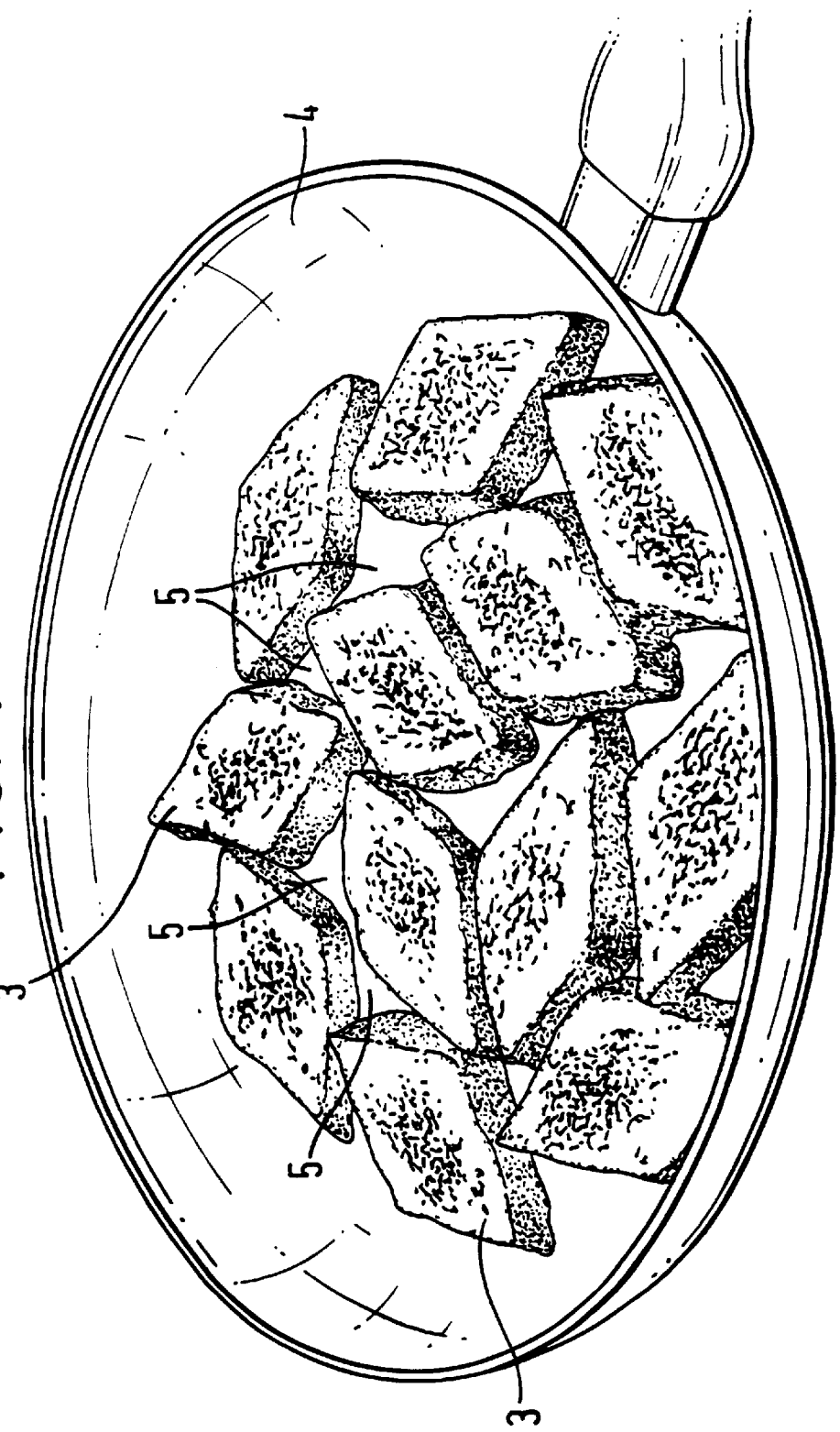

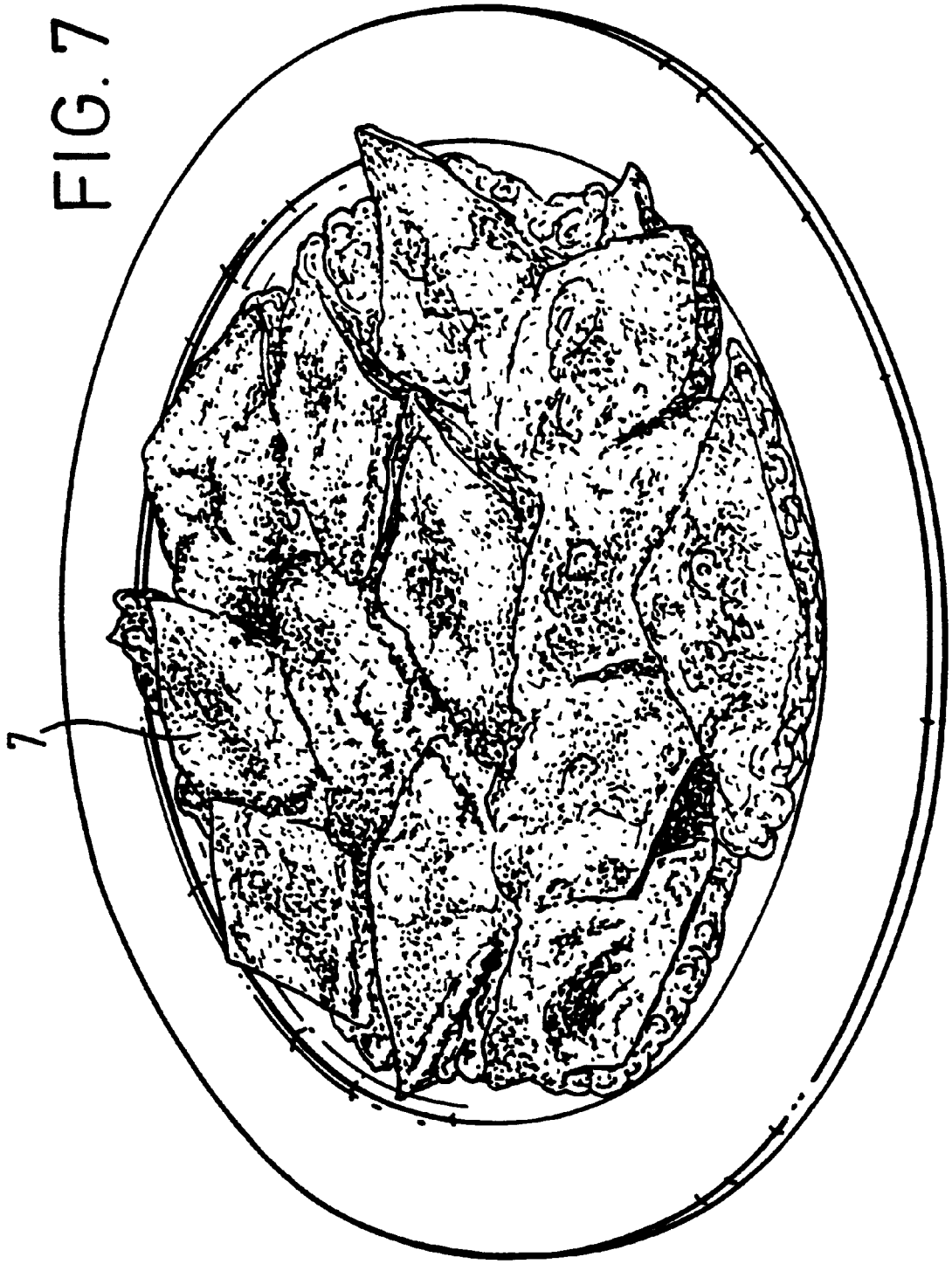

PROVISION OF FROZEN MULTI-LAYERED PASTA AND ITS PREPARATION FOR CONSUMPTION

BACKGROUND OF THE INVENTION

The present invention relates to pasta products, particularly multi-layered pasta products and more particularly to a lasagne product, and to providing such products, particularly when frozen, in a manner for preparation for consumption and to the preparation of such pasta products for consumption.

Conventionally, lasagne are made from sheets of pasta, which, cooked or un-cooked, raw or dehydrated, are layered and a sauce is between the layers, in a baking tray. Depending on the size of the tray, each pasta layer may be constituted of one or more sheets of pasta abutting or slightly overlapping. Normally, the sauce is tomato, béchamel or cheese sauce, meat and tomato sauce or a combination thereof. The layered product is then baked in an oven.

Frozen lasagne are available as a ready meal. Such products are prepared in a tray in a conventional oven or by microwave heating in a microwave oven. Re-heating time for a 600 g lasagne is approximately 40 min. in a conventional oven and 20 min in a microwave oven.

SUMMARY OF THE INVENTION

The present invention provides a method of preparing an alimentary product with pasta layers, said method comprising the steps of providing a plurality of disconnected segments of an alimentary product, each segment comprising layers of pasta, arranging the segments in a pan, adding a cooking liquid to said pan, and heating the segments and the cooking liquid.

DETAILED DESCRIPTION OF THE INVENTION

In a particular application of the method of the invention, it is used for providing a multi-layered product having at least three layers of pasta with a sauce present at least between two of the sheets, that product being referred to hereinafter in this specification as lasagne. The method then comprises the steps of providing a plurality of individual segments of lasagne, arranging the lasagne segments in a pan, adding a cooking liquid to said pan, and heating the lasagne segments and the cooking liquid, the method having been found surprisingly to provide, as compared with previous lasagne preparation methods, a substantially reduced heating time for providing ready-to-eat lasagne from a frozen product.

It has surprisingly been observed that the individual segments of lasagne after re-heating may form one unit of lasagne. The amount of cooking liquid is adjusted to the volume of the lasagne segments and the heating temperature used. To that end, it is preferred that during the heating of the lasagne segments and the cooking liquid, substantially all the cooking liquid is either absorbed in the lasagne segments or evaporated. As the cooking liquid evaporates or is absorbed during the cooking, the pasta in the lasagne segments will tend to stick together and form a united lasagne.

In the present invention the cooking liquid is a cooking or heating medium, e.g. water, milk, bouillon, stock, etc. which is added separately from the alimentary product with pasta layers.

It will be appreciated that the present invention distinguishes alimentary products wherein the segments comprising pasta layers are provided in a liquid sauce, e.g. canned ravioli in sauce, the heating of which is done by pouring the sauce with segments in a pan and heating it. In the present invention, the segments are disconnected, i.e., they are not joined in a liquid sauce.

The lasagne segments and the cooking liquid may be heated to at least 50° C. in the pan, however, the lasagne and the cooking liquid are preferably heated to at least 70° C.

In the present context a pan is a cooking tool which is to be placed on hot-plates. Thus a pan may for instance be a conventional pan, saucepan, a pot with a flat base, a casserole, etc. Advantageously, a non-sticking pan such as a TEFLON pan may be used.

Furthermore, it has surprisingly been observed that frozen lasagne can be prepared in a pan with the layers of pasta and meat filling, the meat filling remains substantially between said layers after re-heating. It has also been found that if the lasagne are provided with sauce as a top layer with the right viscosity of the sauce, it will remain as topping.

The lasagne of the invention are easily portionable for serving, which is generally not the case for conventional lasagne due to the sheets of lasagne extending throughout the whole width of the lasagne. In addition, the consumer is free to choose to prepare a desired size of lasagne, whereas it is inconvenient to divide conventional frozen lasagne, as they are frozen in a block.

Although the invention is particular useful for lasagne, the alimentary product comprising pasta layers may also be e.g. ravioli, tortellini, cannelloni or other pasta products comprising pasta and a filling or sauce. The sauce may for instance be a sauce or other conventional filling for lasagne, e.g. using a meat fish, vegetable base.

Advantageously, the filling sauce, such as tomato sauce, e.g. with meat or vegetable pieces, for the lasagne according to the invention, has a viscosity of max 2 cgr. Bostwick (60 sec at 15° C.). A preferred cheese sauce has a viscosity of 10 cgr Bostwick (60 sec at 60° C.).

An additional advantage of the lasagne segments of the invention is that, if desired, they may be arranged to give an untraditional presentation shape of the lasagne. For example they may be arranged in a star or in other patterns. However, they may also be arranged in a traditional block formation. Shape variation is not possible with the conventional type of lasagne due to their being one big block. Furthermore, the lasagne segments may be heated in a microwave oven with a good result.

The method according to the invention may optionally be used for preparing alimentary products that have not been frozen or are thawed. However, the invention is particularly suitable for the preparing or reconstituting of frozen lasagne.

It will be understood that the various shapes of lasagne segments can be used. Nevertheless, it has been found that if lasagne segments are rhomboid-shaped, they are particularly appropriate for arranging within a pan with a round heating surface due to their ability to, in combination, substantially fill out the whole of the heating surface. Furthermore, the cross-section of such segments allows for a quick heating. Advantageously, the segments are arranged with gaps between them. This allows for a quicker heating of segments as a result of the sides of the lasagne segments being in direct contact with the cooking liquid.

It is preferred that the alimentary product comprises blanched pasta sheets. However, it is possible that the pasta sheets may be raw or dehydrated. The cooking time of the lasagne segments and the added cooking liquid will, however, have to be adjusted accordingly.

The lasagne segments may comprise at least two layers of pasta. However, it is preferred that the lasagne segment comprises at least three layers of pasta.

The size of the segments may vary. Nevertheless, it is preferred that the segments are not shorter than 2 cm. If the segments are too small, arranging them in a pan is too laborious. However, if the segments are too big they may be difficult to arrange in the pan in a suitable manner and the heating time will be increased. Consequently, it is preferred that the largest dimension is not longer than 15 cm, preferably not more than 12 cm.

Conveniently, the unit weight of a segment is from 20 to 80 grams, preferably from 40 to 60 grams.

In order to provide a good heating of the lasagne to be heated, it is preferred that the lasagne segments are 2 to 3 cm thick, most preferably about 2 cm.

It may be desirable to provide the upper surface of the segments with a browning or gratin. For this, the upper layer of lasagne is coated with, for example, a cheese or cheese sauce and passed beneath a grill or another type of heating element. Instead of such an upper cheese sauce or as a compliment thereto, a grated cheese topping may be provided. Furthermore, colouring agents may be used to enhance the colour of the top surface of the lasagne.

When the consumer arranges such segments in the pan, the browned or gratined surface should consequently be facing upwards.

In a particular preferred embodiment of the invention the lasagne are prepared in accordance with the method described in U.S. application Ser. No. 09/092,336, filed on the same day as this application, and also in European patent application with the title "Encapsulated Alimentary Product Comprising Pasta and Filling", the contents of which are incorporated herein by reference. In the method of the these applications, the alimentary product production comprises the steps of providing the lasagne segment with an edible coating encapsulation, preferably a sauce encapsulation.

In the coated embodiment of the invention, the lasagne has a coating of sauce on all surfaces and thus also on the side and at the base of the lasagne segments. This allows for a cooking in a pan on a hot plate which may result in an easy release of the lasagne from the pan after heating.

As mentioned above, the invention is not limited to the preparation of lasagne. Optionally, also other types of pasta products comprising layers of pasta and filling arranged between said layers may be prepared in accordance with the method of the invention. Depending on the meal to be prepared, the amount of cooking liquid and the degree of evaporation of the cooking liquid required in the preparation may vary. Other pasta products which advantageously may be prepared, are meals comprising, for example, ravioli or tortellini. For this, the segments are then constituted by the individual ravioli or tortellini. In general the considerations on process conditions and the preferred recipes given above may also be applied on other pasta products comprising layers of pasta.

The invention is explained in further detail by example only, with reference to the accompanying drawings and the examples below.

BRIEF DESCRIPTION OF THE DRAWING FIGURES

FIG. 4 illustrates lasagne segment being arranged in a pan and the addition of cooking liquid is shown in FIG. 5.

FIG. 7 shows the serving of a lasagne on a plate.

DETAILED DESCRIPTION OF THE DRAWING FIGURES

Figure 1:
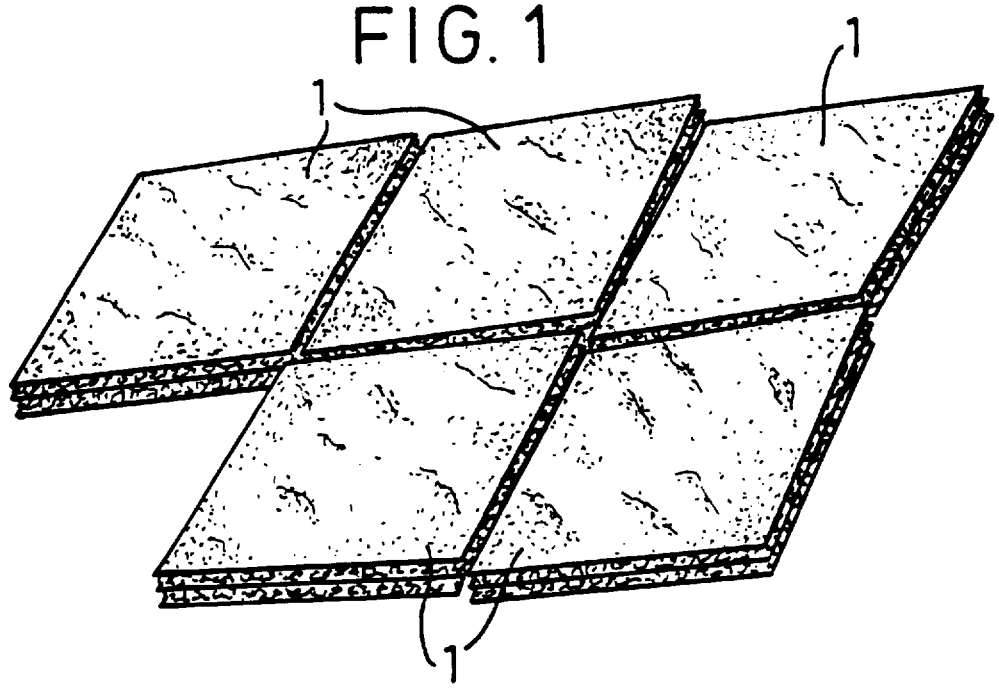
FIG. 1 illustrates frozen lasagne segments.
Figure 2:
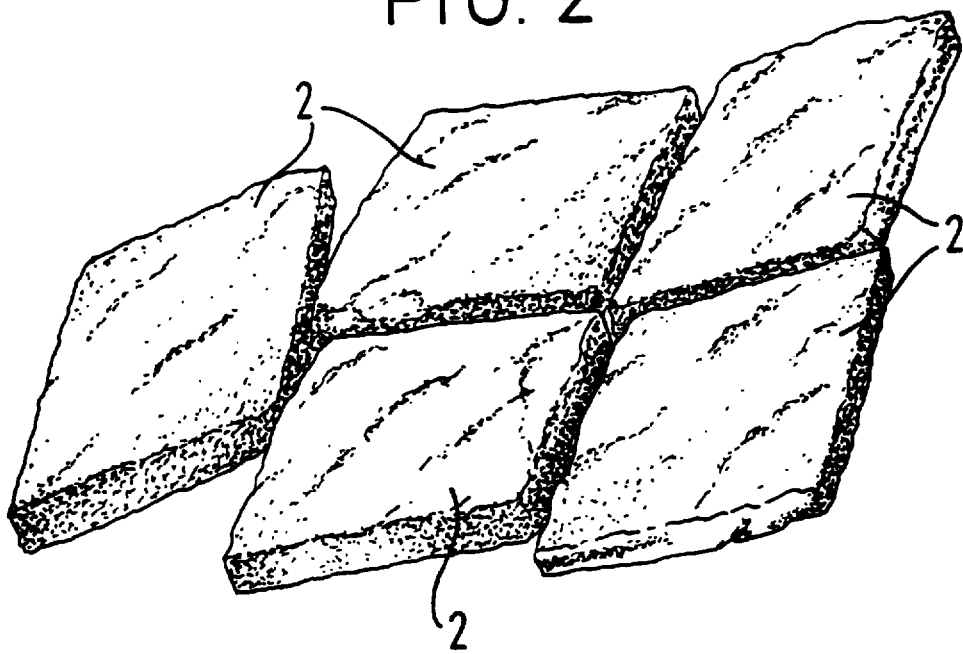
FIG. 2 illustrates frozen lasagne segment encapsulated in an edible coating in accordance with a preferred embodiment of the invention.

FIG. 1 shows lasagne segments 1 cut out of a lasagne. The lasagne segments are composed by three layers of pasta with a filling between the layers. The lasagne segments 1 are, in a preferred embodiment, encapsulated in a sauce 2 in accordance with the U.S. '326 application and the European patent application referred to (see FIG. 2). The lasagne segments are browned on the upper surface 3 to obtain a attractive appearance and flavouring of the browning, and frozen into individually frozen segments. A surface browned lasagne segment is shown in FIG. 3.

FIGS. 4 to 7 illustrate the steps taken in the preparation of the lasagne 7 in a frying pan 4. The lasagne segments 1 are arranged in the frying pan 4. The individual segments preferably positioned adjacent to but not abutting neighbouring segments. Advantageously, there are gaps 5 between the segments. In a particularly advantageously embodiment of the invention, the lasagne segments are rhomboid shaped. This makes the segments specifically suitable for arranging in a circular frying pan and due to the geometry of the lasagne segments allows the majority of the heating surface of the pan to be covered. Optionally, other geometry of lasagne segments may be used. For example, the shape of the base surface of the lasagne segments 1 may be that of a figure, animal or other shapes that makes it attractive for a children's meal.

Figure 3:
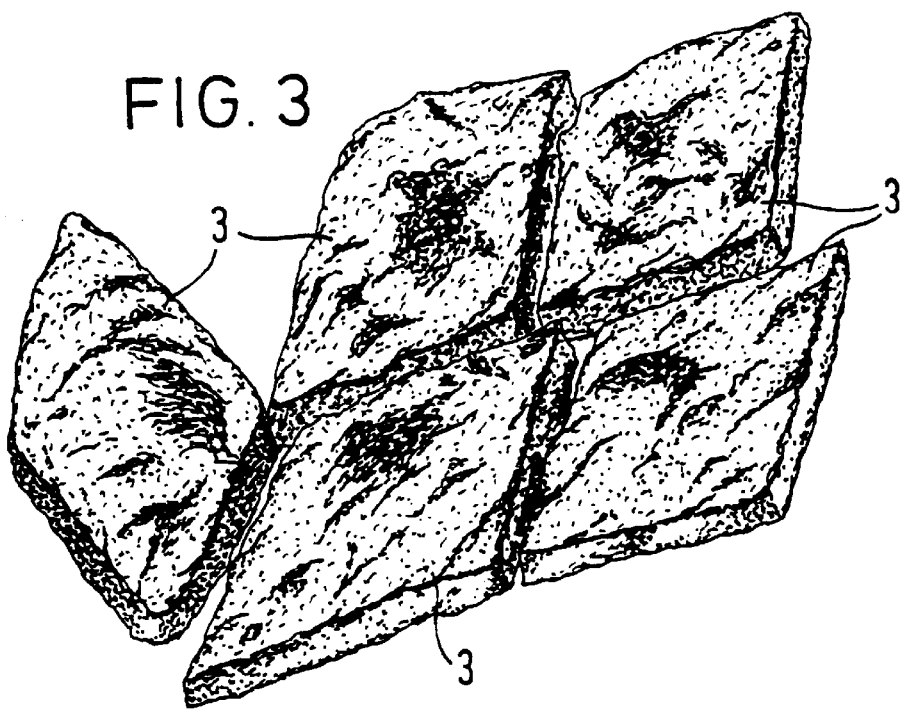
FIG. 3 illustrates lasagne segment provided with a top browning.
Figure 6:
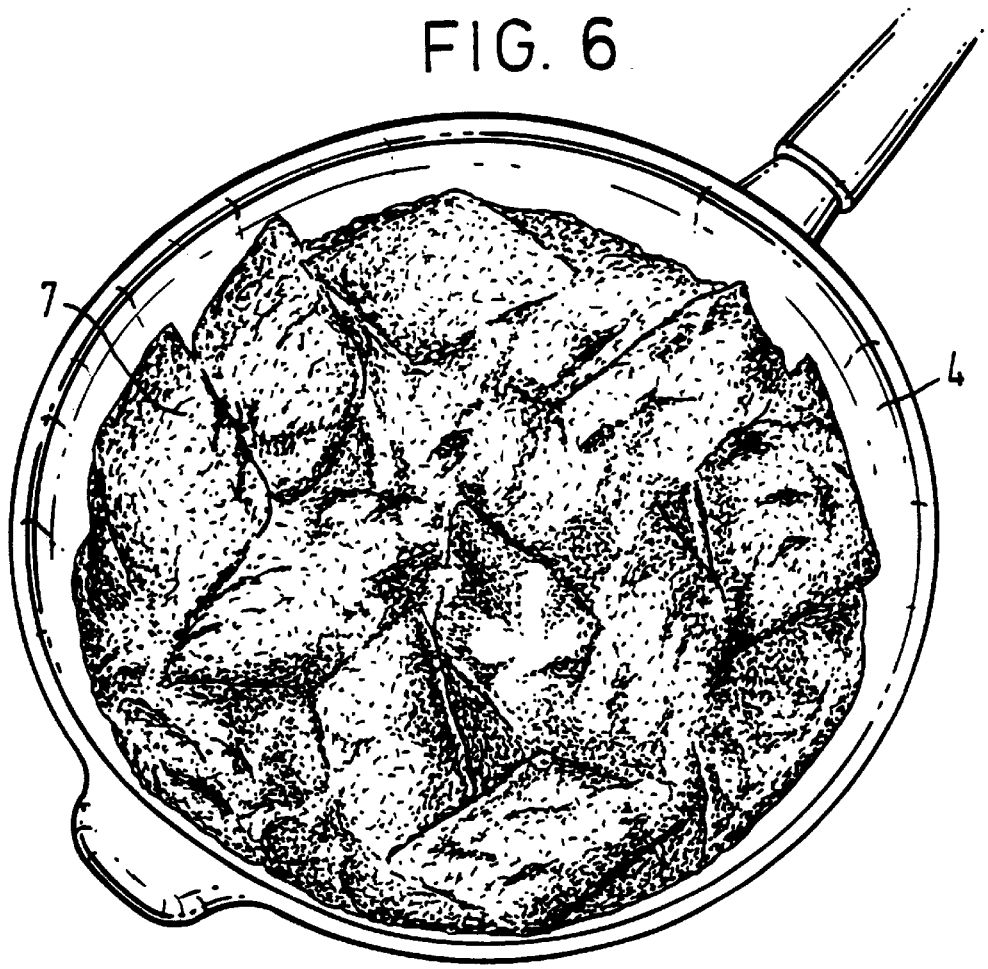
FIG. 6 shows the lasagne according to the invention prepared in a pan.

In the example illustrated in FIG. 3 the upper browning of the lasagne segments requires that the person preparing the pan lasagne positions the lasagne segments 1 with the browned surface 3 upwards to present the most attractive appearance of the lasagne.

Figure 5:
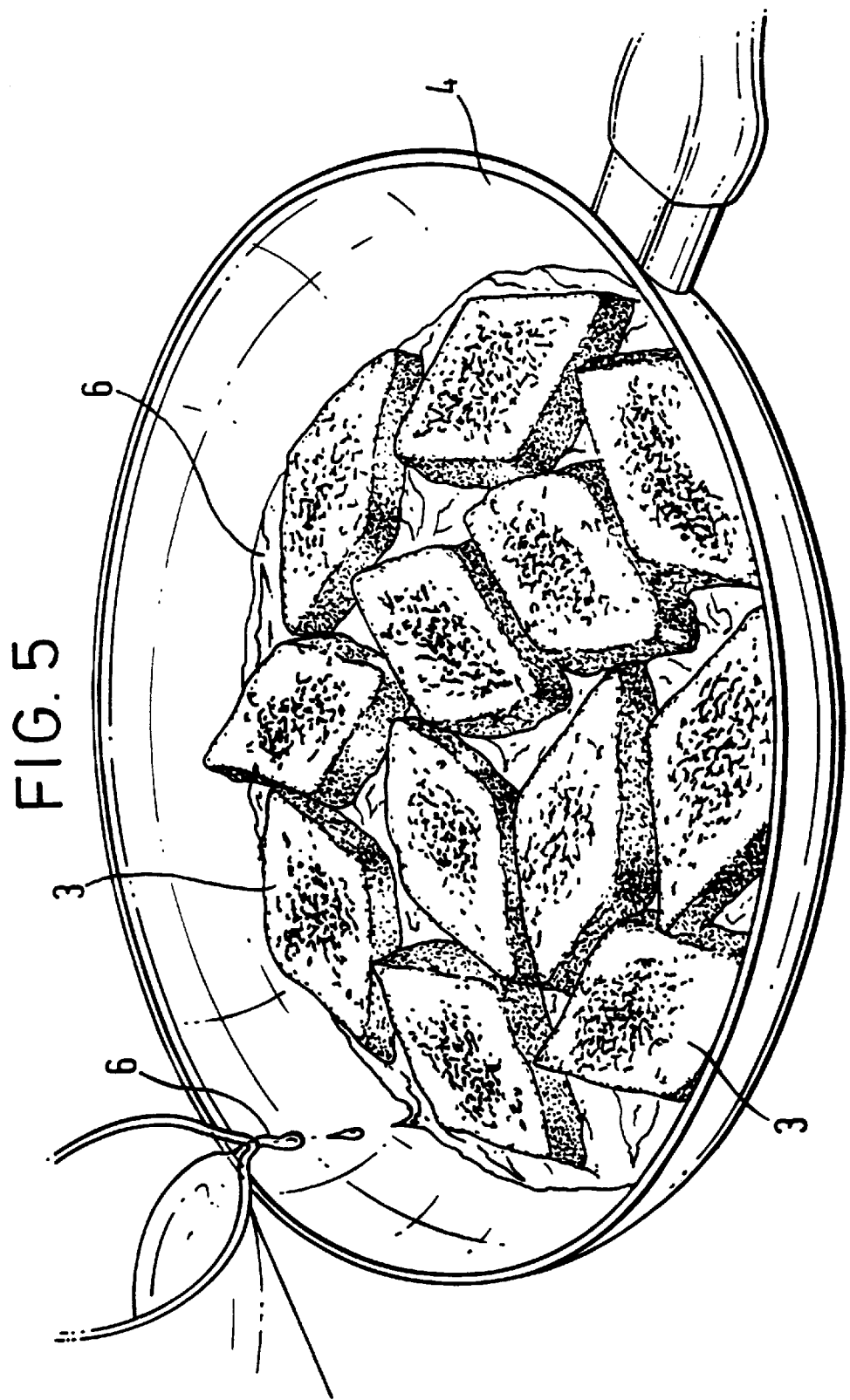

Once the frozen lasagne segments 1 are arranged in the frying pan 4, cooking liquid 6 is (see FIG. 5). The frying pan 4 is then posed onto a hot plate, conveniently at the highest possible heat. During the heating, the cooking liquid 6 evaporates and is absorbed in the lasagne segments. The result is lasagne segments 1 which tend to adhere to each other creating a united lasagne 7 (see FIG. 6). On example of a lasagne 7 prepared by pan cooking in accordance with the innovation is shown in FIG. 7.

EXAMPLES

Example 1

Manufacturing of Lasagne Segments

Lasagne segments having 3 layers of pasta may be produced conveniently by first blanching the sheets to be lowermost positioned in a continuous blancher and forwarded on a belt conveyor, each sheet having the width of the final lasagne segments. A string of Bolognaise sauce is extruded continuously lengthwise on each sheet. The middle pasta sheets are blanched in a continuous blancher and positioned on the Bolognaise sauce. On top of the middle pasta sheet another layer of sauce is extruded and onto this a top pasta sheet is deposited. Also the middle and top pasta sheets are of the same width as the final lasagne segments. The lasagne are cut lengthwise, e.g. by guillotine cutter, which thereby provides segments which have a top and bottom comprised of the sheets, as indicated above, and wherein edges of the sheets comprise and define the segment sides referred to above and as is apparent from the drawing Figures. The lasagne segments are subsequently covered with cheese sauce in accordance with the method described in the noted U.S. '326 application and European patent application. If desired, the top of the lasagne segments are browned by passing the segments beneath a heating or grill element. The lasagne segments are then transferred to a freezer, e.g. a surface contact freezer for deep-freezing. The frozen lasagne segments are finally packed, e.g. with a number of lasagne segments in each pack corresponding to what is needed for one lasagne portion, and thus, the segments are obtained from the pack when they are to be prepared for consumption.

The pasta, Bolognese and cheese sauces are as described in the examples below. Other types of sauce may also be suitable.

Example 2

Pasta

A suitable pasta dough may comprise 70 to 80% flour, 15 to 20% whole egg by weight and water. The flour preferably being semolina flour.

The pasta dough is mixed and passed through a kneader and sheeter and calibrated, for example, a thickness of about 1.5 mm. The sheeted pasta is then preferably blanched.

Example 3

Cheese Sauce

Cheese sauce may be prepared from the following ingredients (by weight):

Fat 6 to 8%

Flour and starch 5 to 6%

Milk powder 7 to 9%

Cheese 4 to 8%

Salt, pepper, spices and water.

Example 4

Sauce Bolognese

Bolognese sauce may be prepared in a conventional way by cooking beef, onion, tomato puré, tomato, cheese, carrots, celeriac and herbs together.

Example 5

Preparation of Lasagne

Segments of lasagne were heated in a pan in accordance with the invention. A block of lasagne of a similar recipe was heated in a conventional oven. The prepared lasagne were tested and the taste and texture found to be the same. The lasagne is easily releasable from the pan heating surface.

Examples 6 and 7

Comparative

A 600 grams block of frozen lasagne is heated in a conventional oven at 225° C. For heating throughout at a temperature of 70° C. it is found to take approximately 40 min.

Frozen lasagne segments of the same recipe are prepared. 12 rhomboid-shaped frozen lasagne segments of 50 gram each are arranged in a pan. Each segment has the following dimensions: 90*50*17 mm. 150 ml water is used as cooking liquid. The cooking plate is set at high heat. The cooking liquid is evaporated or absorbed in the lasagne segments during the cooking and a joint lasagne constituted by the 12 segments is provided. Heating throughout is found to take approximately 10 to 12 min.

I claim:

1. A process for providing a pasta product for consumption comprising obtaining a plurality of individual frozen pasta product segments from a pack, wherein the individual frozen segments comprise three pasta sheet layers and a sauce present between the pasta sheet layers and wherein edges of the pasta sheets define segment sides, arranging the plurality of the obtained segments in a pan and adding a cooking liquid in the pan with the segments and heating the segments and cooking liquid for preparing the segments for consumption, wherein the segments are arranged in the pan and the cooking liquid is added so that individual segments are arranged adjacent one to another segment-side-to-segment-side and so that the cooking liquid is present between adjacent segment sides and so that upon heating the segments and cooking liquid for preparing the segments for consumption, the segments absorb the cooking liquid and the segment sides adjacent one to another tend to join and stick together.

2. A process according to claim 1 wherein the segments have a segment unit weight of from 20 grams to 80 grams.

3. A process according to claim 1 wherein the cooking liquid is selected from the group consisting of water, milk, bouillon and stock.

4. A process according to claim 1 wherein the segments and cooking liquid are heated to a temperature of at least 50° C.

5. A process according to claim 1 wherein the segments and cooking liquid are heated to a temperature of at least 70° C.

6. A process according to claim 1 wherein the individual segments have length and width dimensions of from 2 cm to 15 cm and have a thickness of from 2 cm to 3 cm.

7. A process according to claim 1 wherein the individual segments have a rhomboid shape.

8. A process according to claim 1 wherein the sheet layers comprise blanched pasta sheets.

9. A process according to claim 1 wherein the lasagne has a surface coated with a substance selected from the group consisting of a cheese and a sauce comprising a cheese.

10. A process according to claim 1 wherein the lasagne has a surface which is browned.

11. A process according to claim 8 wherein the coated surface is browned.

12. A process according to claim 1 wherein the individual segments are encapsulated in an edible coating.

13. A process according to claim 12 wherein the edible coating is a sauce.

* * * * *